(12) United States Patent
Sasaki

(10) Patent No.: US 7,676,278 B2
(45) Date of Patent: Mar. 9, 2010

(54) FAULT TOLERANT TRANSPORT MECHANISM IN STORAGE AND METHOD OF CONTROLLING THE SAME

(75) Inventor: Shinobu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 11/050,025

(22) Filed: Feb. 4, 2005

(65) Prior Publication Data

US 2006/0087927 A1    Apr. 27, 2006

(30) Foreign Application Priority Data

Oct. 25, 2004    (JP) .............................. 2004-309979

(51) Int. Cl.
*G11B 7/085*    (2006.01)
(52) U.S. Cl. .................. 700/2; 700/213; 369/30.27; 414/277; 414/281
(58) Field of Classification Search .............. 700/2, 700/213; 369/30.27; 414/277, 281
See application file for complete search history.

(56) References Cited

U.S. PATENT DOCUMENTS

| | | | |
|---|---|---|---|
| 4,937,690 A * | 6/1990 | Yamashita et al. ............ 360/92 |
| 5,513,156 A | 4/1996 | Hanaoka et al. | |
| 5,640,510 A | 6/1997 | Hanaoka et al. | |
| 5,768,141 A | 6/1998 | Hanaoka et al. | |
| 5,809,543 A * | 9/1998 | Byers et al. ................. 711/162 |
| 5,986,835 A * | 11/1999 | Tanaka et al. ................ 360/53 |
| 6,161,058 A * | 12/2000 | Nishijo et al. ............... 700/218 |
| 6,215,315 B1 * | 4/2001 | Maejima ..................... 324/539 |
| 6,262,863 B1 * | 7/2001 | Ostwald et al. ............... 360/92 |

FOREIGN PATENT DOCUMENTS

| | | |
|---|---|---|
| JP | 4-23118 | 1/1992 |
| JP | 7-44335 | 2/1995 |
| JP | 10-255373 | 9/1998 |
| JP | 10-261253 | 9/1998 |

OTHER PUBLICATIONS

KIPO Office Action dated Jun. 26, 2006 of Application No. 10-2005-0013837.
Japanese Office Action mailed on May 12, 2009 in corresponding Japanese Patent Application 2004-309979.

* cited by examiner

*Primary Examiner*—Albert DeCady
*Assistant Examiner*—Tejal Gami
(74) *Attorney, Agent, or Firm*—Staas & Halsey LLP

(57) ABSTRACT

First and second mobile carriers are accessible to individual cells defined in a storage. The first and second mobile carriers move along overlapped paths. First and second controller circuits are connected to the first and second mobile carriers, respectively. The second controller circuit is also connected to the first mobile carrier. Even when a defect occurs in the first controller circuit, the transport mechanism allows the second controller circuit to take over the control on the first mobile carrier from the first controller circuit. The control on the first mobile carrier serves to avoid interference between the first mobile carrier and any obstacle on the path. If the first mobile carrier is removed from the path of the second mobile carrier, the second mobile carrier is allowed to keep operating. The operation of the transport mechanism can be kept without any interruption.

14 Claims, 8 Drawing Sheets

FAULT TOLERANT TRANSPORT MECHANISM IN STORAGE AND METHOD OF CONTROLLING THE SAME

BACKGROUND OF THE INVENTION

1. Field of the Invention

The present invention relates to a transport mechanism preferably employed in a library apparatus such as a magnetic tape library apparatus, for example. In particular, the invention relates to a transport mechanism including first and second mobile carriers accessible to individual cells defined in a storage.

2. Description of the Prior Art

As disclosed in Japanese Patent Application Publication 10-255373, a library apparatus sometimes includes first and second mobile carriers accessible to individual cells defined in a storage. The library apparatus includes a first controller circuit connected to a power source of the first mobile carrier. A second controller is connected to a power source of the second mobile carrier. The movement path of the first mobile carrier partially wraps over the movement path of the second mobile carrier.

For example, when the first mobile carrier is urgently stopped based on the instructions from the second controller circuit, the first controller circuit cannot control the first mobile carrier. The first mobile carrier cannot move at all. The first mobile carrier thus interferes with the movement of the second mobile carrier. Unless the first controller circuit is started again, the second mobile carrier cannot return to the operation. The library apparatus is expected to always operate without any interruption.

SUMMARY OF THE INVENTION

It is accordingly an object of the present invention to provide a transport mechanism enabling a constant operation without any interruption.

According to a first aspect of the present invention, there is provided a transport mechanism comprising: a first mobile carrier accessible to individual cells defined in a storage, said first mobile carrier designed to move along a first path; a second mobile carrier accessible to the individual cells, said second mobile carrier designed to move along a second path at least partially wrapping over the first path; a first controller circuit connected to a driving source incorporated within the first mobile carrier; and a second controller circuit connected to a driving source incorporated within the second mobile carrier, said second controller circuit being connected to the driving source in the first mobile carrier.

Even when a defect occurs in the first controller circuit, the transport mechanism allows the second controller circuit to take over the control on the driving source in the first mobile carrier from the first controller circuit. The control on the driving source in the first mobile carrier serves to avoid interference between the first mobile carrier and any obstacle on the first path. The movement of the first mobile carrier can be ensured. For example, the first mobile carrier can be removed from the second path of the second mobile carrier. The second mobile carrier is allowed to move along the second path without any interference. The second mobile carrier keeps operating under the control of the second controller circuit. The operation of the transport mechanism can be kept without any interruption.

The transport mechanism may further comprise a grasping mechanism incorporated within the first mobile carrier. The grasping mechanism is designed to move based on a driving force from the driving source between a first position where the grasping mechanism holds an object in one of the cells and a second position where the grasping mechanism is withdrawn from the cell. The grasping mechanism at the first position is supposed to hinder the movement of the first mobile carrier in most cases. If the second controller circuit serves to move the grasping mechanism to the second position, the grasping mechanism is prevented from contact with the cells. The movement of the first mobile carrier can thus be ensured. In this case, the transport mechanism may further comprise a detector incorporated within the first mobile carrier for connection to the first and second controller circuits. The detector is designed to detect the status of the first mobile carrier. The detector is allowed to detect the grasping mechanism at the first position.

According to a second aspect of the present invention, there is a method of controlling a transport mechanism, comprising: controlling a first mobile carrier based on the operation of a first controller circuit when receiving instructions to access to a cell defined in a storage; and controlling the first mobile carrier based on the operation of a second controller circuit connected to a second mobile carrier when a defect is detected in the first controller circuit.

The method allows the second controller circuit to take over the control on the first mobile carrier from the first controller circuit even when a defect occurs in the first controller circuit. The control on the first mobile carrier serves to avoid interference between the first mobile carrier and any obstacle. The movement of the first mobile carrier can be ensured. For example, the first mobile carrier can be removed from the path of the second mobile carrier. The second mobile carrier is allowed to move along the path without any interference. The second mobile carrier keeps operating under the control of the second controller circuit. The operation of the transport mechanism can be kept without any interruption.

The status of a grasping mechanism may be monitored to detect the defect in the method. The grasping mechanism may be incorporated within the first mobile carrier so as to grasp an object in the cell. The process serves to detect a defect, so that the second controller circuit operates to withdraw the grasping mechanism from the cell in response to the detection. Otherwise, contact may be monitored between the first mobile carrier and the storage so as to detect the defect. The process serves to detect a defect, so that the second controller circuit operates to withdraw the grasping mechanism from the cell in response to the detection.

According to a third aspect of the present invention, there is provided a computer-readable storage medium containing program instructions for controlling a transport mechanism, comprising: computer program code causing a processor to check the status of a first mobile carrier when the processor has received a signal specifying a defect in the first mobile carrier; and computer program code causing the processor to control operation of a second mobile carrier in response to the status of the first mobile carrier.

When the program instructions are implemented, the status of the first mobile carrier is checked upon a defect in the first mobile carrier. If the operation of the second mobile carrier is controlled in response to the status of the first mobile carrier, the second mobile carrier keeps operating without any interference with the first mobile carrier.

Here, the status of a grasping mechanism may be monitored to check the status. The grasping mechanism may be incorporated within the first mobile carrier so as to grasp an object in a cell defined in a storage. The grasping mechanism may be withdrawn from the cell when a defect occurs in the first mobile carrier. The movement of the first mobile carrier can thus be ensured. Otherwise, contact may be monitored between the first mobile carrier and a storage defining cells so as to check the status. The grasping mechanism may be withdrawn from the storage when a defect occurs in the first mobile carrier. The movement of the first mobile carrier can thus be ensured.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
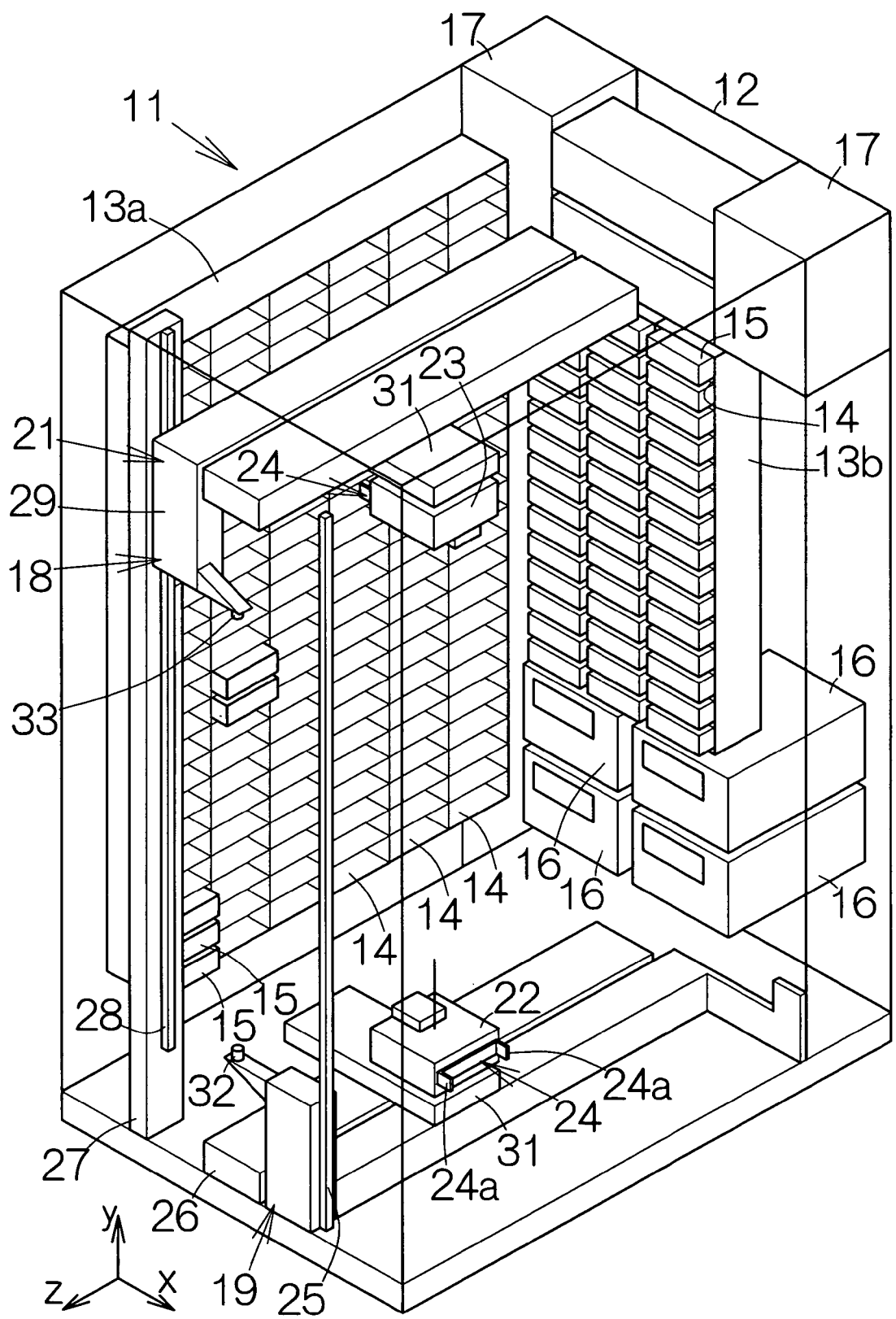
FIG. 1 is a perspective view schematically illustrating the overall structure of a magnetic tape library apparatus.

FIG. 1 schematically illustrates a magnetic tape library apparatus as an example of a library apparatus. The magnetic tape library apparatus 11 includes an box-shaped enclosure 12. The enclosure 12 defines an inner space of a parallelepiped standing upright from a floor, for example. Storage cabinets 13a, 13b are placed within the inner space of the enclosure 12. A pair of storage cabinet 13a is opposed to each other interposing a predetermined central space of a parallelepiped. Another storage cabinet 13b is placed at a position adjacent the central space. The individual storage cabinet 13a, 13a, 13b includes cells 14, 14, . . . arranged along a plane upright to the floor, namely a side surface of the central space. Objects or recording media such as magnetic tape cartridges 15 are contained within the individual cells 14.

Here, an xyz-coordinate system is defined in the central space. The y-axis of the xyz-coordinate system is set perpendicular to the floor. The y-coordinate thus serves to identify the position of the cells 14 in the vertical direction. The z-axis of the xyz-coordinate system is set to extend in the horizontal direction in parallel with the storage cabinets 13a, 13a. The z-coordinate thus serves to identify the position of the cells 14 in the storage cabinets 13a, 13a in the horizontal direction. The x-axis of the xyz-coordinate system is set to extend in the horizontal direction in parallel with the storage cabinet 13b. The x-coordinate thus serves to identify the position of the cells 14 in the storage cabinet 13b in the horizontal direction.

For example, four magnetic recording medium drives or magnetic tape drives 16 are incorporated within the inner space of the enclosure 12. The magnetic tape drives 16 are designed to write magnetic information data into a magnetic recording tape inside the magnetic tap cartridge 15. The magnetic tape drives 16 are also designed to read magnetic information data out of the magnetic recording tape inside the magnetic tape cartridge 15. The magnetic tape cartridge 15 is inserted into and withdrawn from the magnetic tape drive 16 through a slot. The magnetic recording tape is unwound from a reel within the magnetic tape cartridge 15 in the magnetic tape drive 16. The unwound magnetic recording tape is then wound around a reel within the magnetic tape drive 16.

A pair of storage box 17 is incorporated within the inner space of the enclosure 12. A library controller board and a first controller board are contained within one of the storage boxes 17. A second controller board is contained within the other of the storage boxes 17. The library controller board and the first and second controller boards will be described later in detail. An outside host computer, not shown, is connected to the library controller board. Various processings are effected at the library controller board as well as the first and second controller boards based on data and/or instructions supplied from the host computer.

A transport mechanism 18 is incorporated within the central space in the enclosure 12. The transport mechanism 18 includes first and second mobile carriers 19, 21. The first and second mobile carriers 19, 21 are designed to carry the magnetic tape cartridge 15 between the individual cells 14, 14, . . . and the individual magnetic tape drives 16.

The first and second mobile carriers 19, 21 includes a mobile unit 22, 23, respectively. A grasping mechanism 24 is incorporated in the mobile unit 22, 23. The grasping mechanism 24 is designed to hold the magnetic tape cartridge 15. The grasping mechanism 24 includes a pair of claw 24a, 24a spaced from each other in the horizontal direction. When the claws 24a, 24a are positioned at positions closest to each other, the magnetic tape cartridge 15 of a predetermined attitude can be held between the claws 24a, 24a. The grasping mechanism 24 in this manner carries the magnetic tape cartridge 15. When the claws 24a, 24a gets distanced furthest from each other, the magnetic tape cartridge 15 can be released from the grasping mechanism 24. The mobile unit 22, 23 is designed to oppose the grasping mechanism 24 to the opening of the individual cell 14 when the grasping mechanism 24 holds or releases the magnetic tape cartridge 15.

The first mobile carrier 19 is coupled to a first support column, not shown, standing upright from the floor. A first rail 25 is fixed to the first support column. The first rail 25 extends in the vertical direction. A first rail base 26 is coupled to the first rail 25. The first rail base 26 is designed to move upward and downward along the first rail 25 in parallel with the y-axis. A drive mechanism is connected to the first rail base 26 for the upward and downward movement. The drive mechanism may include a belt coupled to the first rail base 26 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example. The first rail base 26 extends in parallel with the storage cabinets 13a, 13a. The first rail base 26 is positioned at an intermediate position equally spaced from the storage cabinets 13a, 13a.

Likewise, the second mobile carrier 21 is coupled to a second support column 27 standing upright from the floor. A first rail 28 is fixed to the second support column 27. The first rail 28 extends in the vertical direction. A first rail base 29 is coupled to the first rail 28. The first rail base 29 is designed to move upward and downward along the first rail 28 in parallel with the y-axis. A drive mechanism is connected to the first rail base 29 for the upward and downward movement. The drive mechanism may include a belt coupled to the first rail base 29 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter. The first rail base 29 extends in parallel with the storage cabinets 13a, 13a. The first rail base 29 is positioned at an intermediate position equally spaced from the storage cabinets 13a, 13a. The first rail bases 26, 29 are arranged in the vertical direction along the y-axis. The first rail base 29 of the second mobile carrier 21 moves above the first rail base 26 of the first mobile carrier 19.

A second rail, not shown, is incorporated within the first rail base 26, 29. The second rail base 31, 31 is coupled to the second rail. The second rail base 31 is designed to move in the horizontal direction along the rail in parallel with the z-axis. A drive mechanism is connected to the second rail base 31 for the horizontal movement. The drive mechanism may include an endless belt wound around a pair of pulleys on the first rail base 26, 29, and a power source establishing a driving force to drive one of the pulleys for rotation, for example. The endless belt may be coupled to the second rail base 31. An electric motor may be utilized as the power source. A stepping motor may be employed as the electric motor, for example. The electric motor is referred to as "z-axis electric motor" hereinafter. The second rail base 31 extends in the horizontal direction in parallel with the storage cabinet 13b.

A third rail, not shown, is incorporated in the second rail base 31. The mobile unit 22, 23 is coupled to the third rail. The third rail is set perpendicular to the xy-plane including the second rail. The mobile unit 22, 23 is thus allowed to move in the horizontal direction along the third rail in parallel with the x-axis. A drive mechanism is connected to the mobile unit 22, 23 for the horizontal movement. The drive mechanism may include an endless belt wound around a pair of pulleys on the second rail base 31, and a power source establishing a driving force to drive one of the pulleys for rotation, for example. The endless belt may be coupled to the mobile unit 22, 23. An electric motor may be utilized as the power source. A stepping motor may be employed as the electric motor, for example. The electric motor is referred to as "x-axis electric motor" hereinafter.

Moreover, the mobile unit 22, 23 is coupled to the second rail base 31 for relative rotation around a rotation axis parallel to the vertical axis or y-axis. A drive mechanism is connected to the mobile unit 22, 23 for the relative rotation. The drive mechanism may include an endless belt wound around a rotation shaft on the mobile unit 22, 23 and a pulley on the second rail base 31, and a power source establishing a driving force to drive the pulley for rotation, for example. An electric motor may be utilized as the power source. A stepping motor may be employed as the electric motor, for example. The electric motor is referred to as "revolution electric motor" hereinafter.

The first and second mobile carriers 19, 21 are designed to have predetermined opposed surfaces spaced from each other in the vertical direction. A columnar elastic piece 32 is fixed to the opposed surface of the first mobile carrier 19. The elastic piece 32 stands upward from the opposed surface. Likewise, a columnar elastic piece 33 is fixed to the opposed surface of the second mobile carrier 21. The elastic piece 33 stands downward from the opposed surface. The elastic piece 32, 33 may be fixed to the first rail base 26, 29. The first and second mobile carriers 19, 21 get closest to each other at the elastic pieces 32, 33. Accordingly, when the first and second mobile carriers 19, 21 approaches each other, the elastic pieces 32, 33 first contact with each other. The impact of the collision can thus be moderated. The first and second mobile carriers 19, 21 are thus protected from the impact of the collision. Moreover, the mobile units 22, 23 are prevented from contact with each other. The mobile units 22, 23 can thus reliably be prevented from suffering from damages. The elastic pieces 32, 33 may be made of an elastic rein material such as rubber.

The magnetic tape library apparatus 11 utilizes the coordinates in the xyz-coordinate system and the angle around the rotation axis for the mobile unit 22, 23 so as to identify the position of the cell 14. The mobile units 22, 23 on the first and second mobile carrier 19, 21 are positioned based on the coordinates in the xyz-coordinate system. At the same time, the attitude or orientation of the mobile unit 22, 23 is determined based on the angle of rotation around the rotation axis. If the mobile unit 22, 23 is positioned in accordance with the coordinates set for the individual cell 14 and controlled for rotation in accordance with the angle of rotation, the mobile unit 22, 23 is allowed to direct the grasping mechanism 24 exactly to the opening of the corresponding cell 14.

Figure 2:
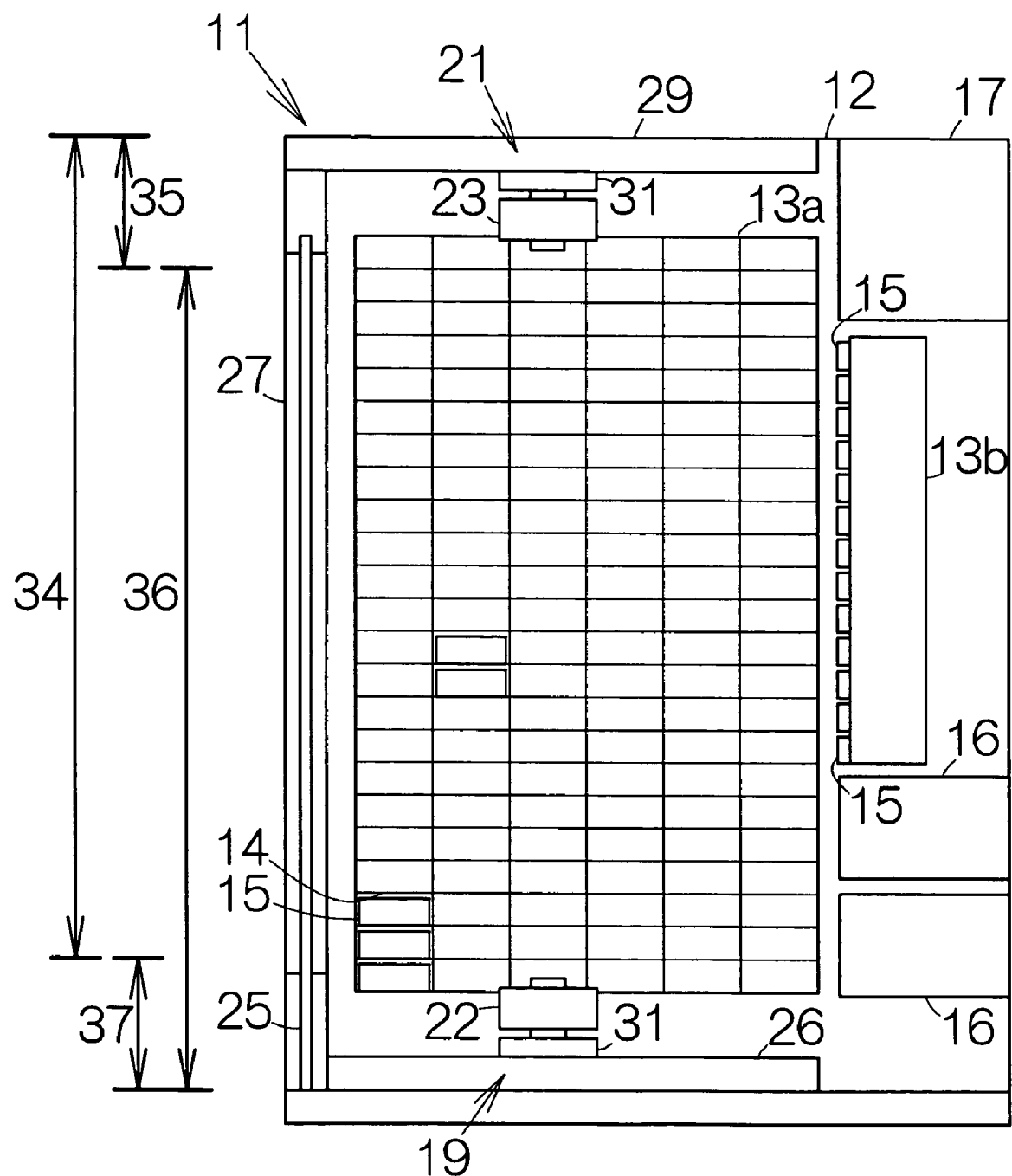
FIG. 2 is a side view of the magnetic tape library apparatus for schematically illustrating movable ranges of first and second mobile carriers.

A predetermined off position is set for the first and second mobile carrier 19, 21 in the magnetic tape library apparatus 11. As shown in FIG. 2, the off position of the second mobile carrier 21 is located at the uppermost position 35 of a movable range 34 of the second mobile carrier 21. The first rail base 29 of the second mobile carrier 21 is positioned at the upper limit of the first rail 28. When the second mobile carrier 21 is positioned at the off position, the first mobile carrier 19 is allowed to access all the cells 14 except the cells 14 at the uppermost row. On the other hand, the off position of the first mobile carrier 19 is located at the lowermost position 37 of a movable range 36 of the first mobile carrier 19. The first rail base 26 of the first mobile carrier 19 is positioned at the lower limit of the first rail 25. When the first mobile carrier 19 is positioned at the off position, the second mobile carrier 21 is allowed to access all the cells 14 except the cells 14 at the lowermost row. The movable range 34 of the second mobile carrier 21 in this manner wraps over the movable range 36 of the first mobile carrier 19 except the uppermost position 35 of the second mobile carrier 21 and the lowermost position 37 of the first mobile carrier 19. Since the storage cabinets 13a, 13b are located closer to each other in the magnetic tape library apparatus 11, the mobile unit 22, 23 contacts with the storage cabinets 13a, 13b at some locations determined by specific coordinates and specific angles of rotation. The locations of the type are excluded from the movable ranges 36, 34 of the first and second mobile carriers 19, 21.

Figure 3:
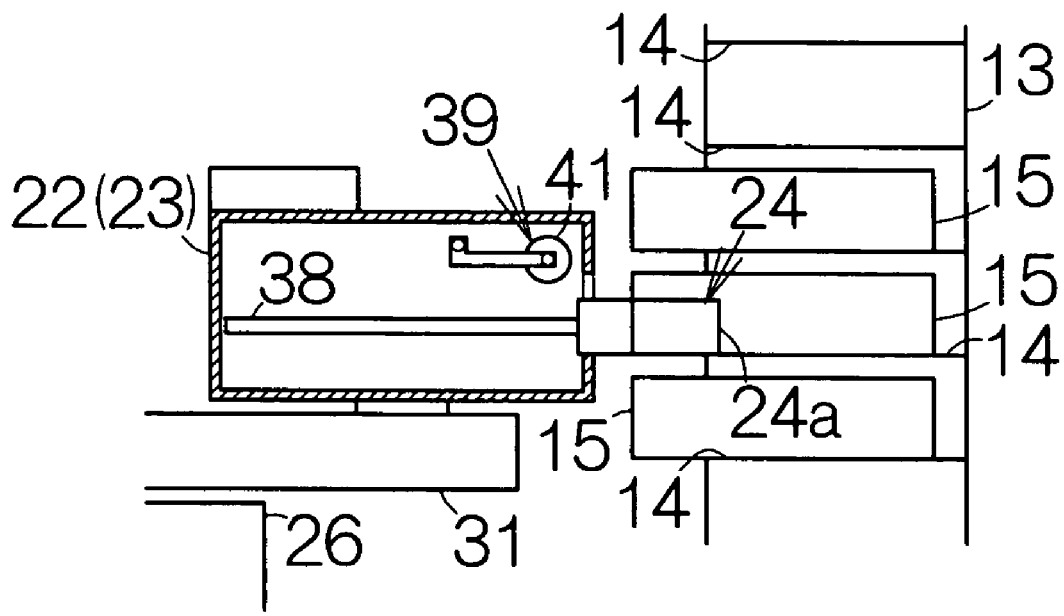
FIG. 3 is a vertical sectional view schematically illustrating the structure of a grasping mechanism.
Figure 4:
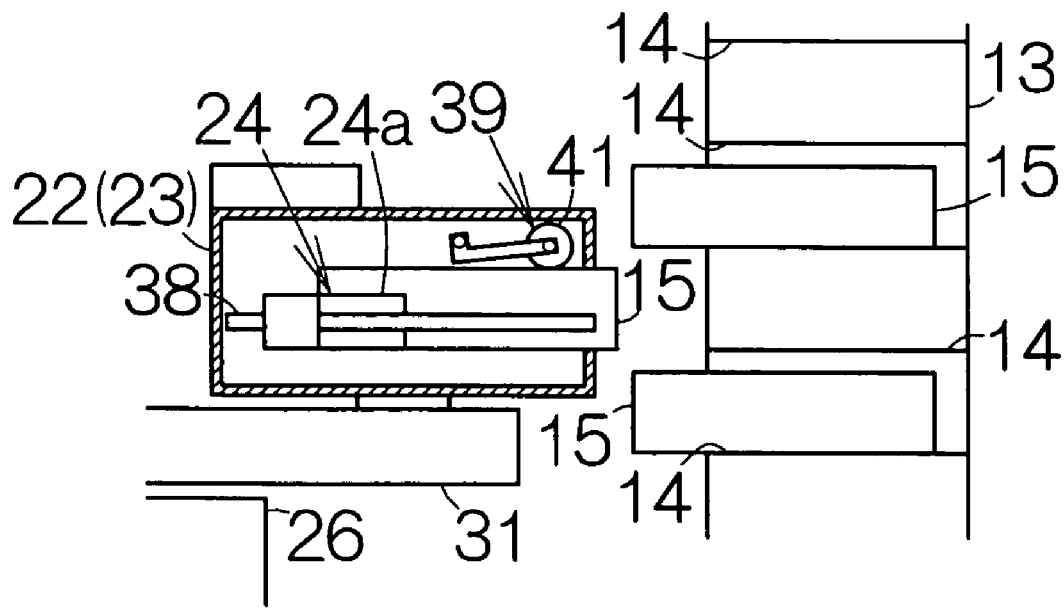
FIG. 4 is a vertical sectional view schematically illustrating the structure of a grasping mechanism.

As shown in FIG. 3, the grasping mechanism 24 includes guide rails 38 designed to guide the movement of the claws 24a, 24a. The guide rails 38 may be incorporated within the mobile unit 22, 23. The claws 24a, 24a are allowed to move between first and second positions. The claws 24a protrude forward farthest out of the mobile unit 22, 23 at the first position, namely the grasp position. The claws 24a retreat inside the mobile unit 22, 23 at the second position, namely the retreat position. A drive mechanism is connected to the claws 24a, 24a for the movement. A so-called rack and pinion mechanism may be utilized as the drive mechanism, for example. A specific power source may be connected to the pinion of the rack and pinion mechanism. An electric motor may be employed as the power source. A stepping motor may be utilized as the electric motor, for example. The electric motor is referred to as "grasping electric motor" hereinafter. When the claws 24a, 24a are positioned at the grasp position, the claws 24a, 24a are allowed to get closer to each other or distanced from each other in the aforementioned manner. As shown in FIG. 4, when the claws 24a, 24a are positioned at the retreat position after holding the magnetic tape cartridge 15 between the claws 24a, 24a, the magnetic tape cartridge 15 can be received completely into the mobile unit 22, 23. The magnetic tape cartridge 15 is completely removed out of the cell 14.

A sensor 39 is incorporated within the mobile unit 22, 23. The sensor 39 is designed to detect the status of the grasping mechanism 24. The sensor 39 includes an elastic roller 14 supported for displacement in the vertical direction, for example. The rotation axis of the elastic roller 41 extends in the horizontal direction within a plane perpendicular to the direction of movement of the magnetic tape cartridge 15. The elastic roller 41 is designed to contact with the magnetic tape cartridge 15 inside the mobile unit 22, 23. The elastic roller 41 is lifted upward in response to the contact with the magnetic tape cartridge 15. This lift can be determined as the presence of the magnetic tape cartridge 15.

Figure 5:
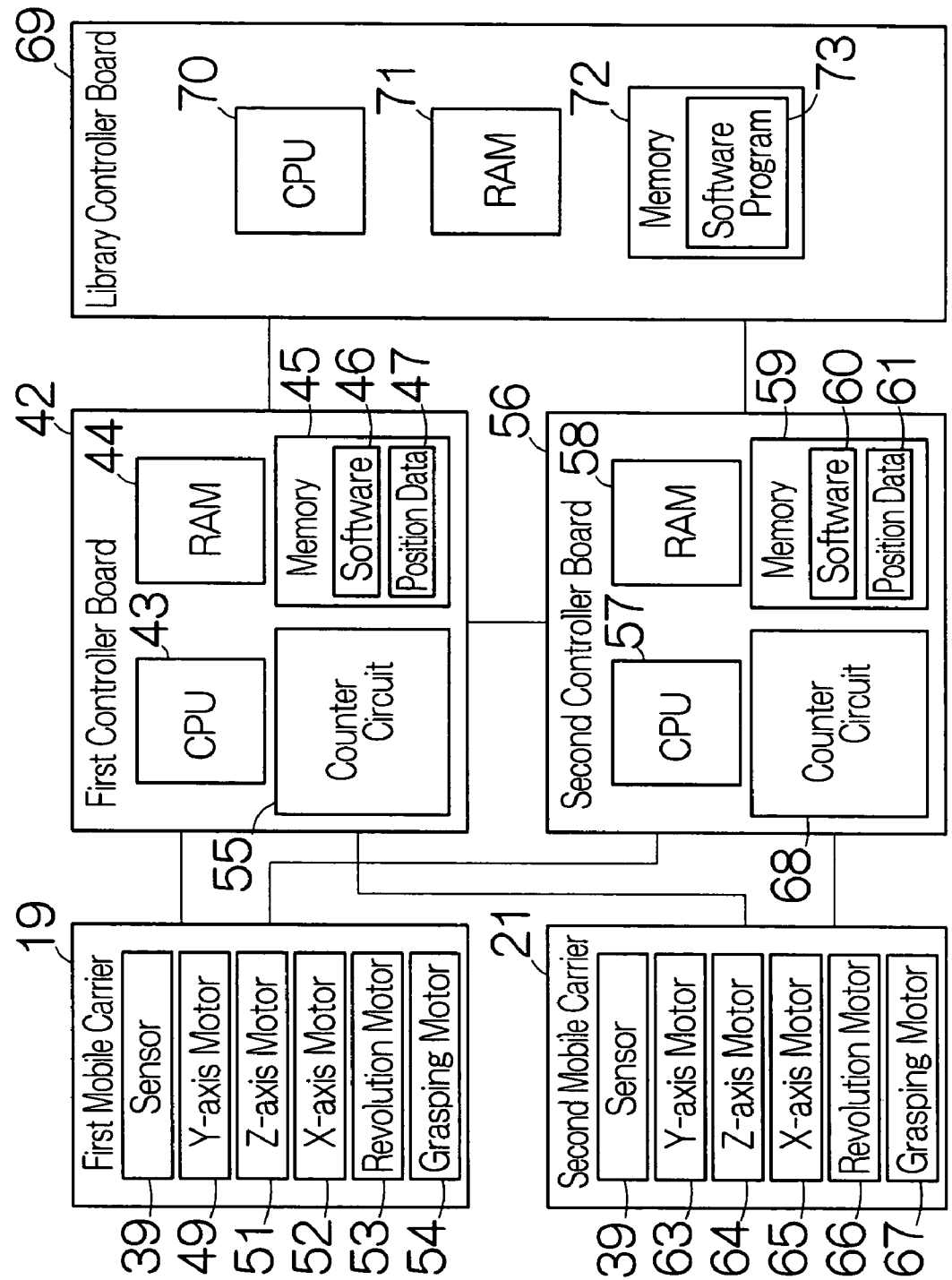
FIG. 5 is a block diagram schematically illustrating the structure of a library controller board as well as of first and second controller boards.

As shown in FIG. 5, a first controller board 42 is connected to the first mobile carrier 19. A first controller circuit or central processing unit (CPU) 43 is mounted on the first controller board 42. A random access memory (RAM) 44 and a non-volatile memory 45 are connected to the CPU 43. A flash memory may be utilized as the non-volatile memory 45, for example.

A software program 46 and a position data 47 are stored in the non-volatile memory 45. The position data specifies the position of the opening for the individual cells 14, 14, . . . in the aforementioned manner. The x-, y- and z-coordinates and the angle of rotation are designated in the position data as described above. The movable range 36, 34 is determined for the first and second mobile carrier 19, 21 based on the position data. The CPU 43 implements the various processings based on the software program 46 and the position data 47 temporarily stored in the RAM 44.

The y-axis electric motor 49, the z-axis electric motor 51, the x-axis electric motor 52, the revolution electric motor 53, and the grasping electric motor 54 in the first mobile carrier 19 are connected to the CPU 43. The CPU 43 is designed to supply the driving signals to the y-axis electric motor 49, the z-axis electric motor 51, the x-axis electric motor 52, the revolution electric motor 53, and the grasping electric motor 54, respectively. The electric motor 49, 51-54 is controlled to rotate over an angle or amount at a revolution rate designated in the driving signal. The angle or amount of rotation set for the electric motors 49, 51-54 serve to determine the amounts of movement in the y-, z- and x-axis and the amount of rotation around the rotation axis, of the mobile unit 22, as well as the amount of movement of the grasping mechanism 24 in the mobile unit 22.

The sensor 39 in the first mobile carrier 19 is connected to the CPU 43. The CPU 43 is designed to receive the sensor signal supplied from the sensor 39. The CPU 43 detects the presence of the magnetic tape cartridge 15 within the mobile unit 22 based on the sensor signal.

A counter circuit 55 is mounted on the first controller board 42. The y-axis electric motor 49, the z-axis electric motor 51, x-axis electric motor 52, the revolution electric motor 53, and the grasping electric motor 54 in the first mobile carrier 19 are connected to the counter circuit 55. The counter circuit 55 is designed to count the pulses output from the encoders in the electric motors 49, 51-54. The CPU 43 calculates the amounts of movement in the y-, z- and x-axis and the amount of rotation of the mobile unit 22 as well as the amount of movement of the claws 24a in the mobile unit 22 based on the counts. Here, a temporal change is recorded in the RAM 44 for the amounts of movement in the y-, z- and x-axis and the amount of rotation of the mobile unit 22 as well as the amount of movement of the claws 24a in the mobile unit 22, respectively. The recordation may periodically be effected within a certain period.

A second controller board 56 is connected to the second mobile carrier 21. A second controller circuit or central processing unit (CPU) 57 is mounted on the second controller board 56. A random access memory (RAM) 58 and a non-volatile memory 59 are connected to the CPU 57. A flash memory may be utilized as the non-volatile memory 59, for example. A software program 60 and a position data 61 are stored in the non-volatile memory 59 in the same manner as described above. The CPU 57 implements the various processings based on the software program 60 and the position data 61 temporarily stored in the RAM 58.

The y-axis electric motor 63, the z-axis electric motor 64, the x-axis electric motor 65, the revolution electric motor 66, the grasping electric motor 67 in the second mobile carrier 21 are connected to the CPU 57. The CPU 57 is designed to supply the driving signals to the y-axis electric motor 63, the z-axis electric motor 64, the x-axis electric motor 65, the revolution electric motor 66, the grasping electric motor 67, respectively. The electric motor 63-67 is controlled to rotate over an angle or amount at a revolution rate designated in the driving signal. The angle or amount of rotation set for the electric motors 63-67 serve to determine the amounts of movement in the y-, z- and x-axis and the amount of rotation around the rotation axis, of the mobile unit 23, as well as the amount of movement of the grasping mechanism 24 in the mobile unit 23.

The sensor 39 in the second mobile carrier 21 is connected to the CPU 57. The CPU 57 is designed to receive the sensor signal supplied from the sensor 39. The CPU 57 detects the presence of the magnetic tape cartridge 15 within the mobile unit 23 based on the sensor signal.

The z-axis electric motor 51, the x-axis electric motor 52, the revolution electric motor 53, the grasping electric motor 54 in the first mobile carrier 19 are also connected to the CPU 57. The CPU 57 is allowed to control the z-axis electric motor 51, the x-axis electric motor 52, the revolution electric motor 53, the grasping electric motor 54 in the first mobile carrier 19. The angle or amount of rotation set for the electric motors 51-54 serve to determine the amounts of movement in the z- and x-axis and the amount of rotation around the rotation axis, of the mobile unit 22, as well as the amount of movement of the grasping mechanism 24 in the mobile unit 22.

A counter circuit 68 is mounted on the second controller board 56. The y-axis electric motor 63, the z-axis electric motor 64, the x-axis electric motor 65, the revolution electric motor 66, the grasping electric motor 67 in the second mobile carrier 21 are connected to the counter circuit 68. The counter circuit 68 is designed to count the pulses output from the encoders in the electric motors 63-67. The CPU 57 calculates the amounts of movement in the y-, z- and x-axis and the amount of rotation of the mobile unit 23 as well as the amount of movement of the claws 24a in the mobile unit 23 based on the counts. Here, a temporal change is recorded in the RAM 58 for the amounts of movement in the y-, z- and x-axis and the amount of rotation of the mobile unit 23 as well as the amount of movement of the claws 24a in the mobile unit 23, respectively. The recordation may periodically be effected within a certain period.

The y-axis electric motor 49, the z-axis electric motor 51, the x-axis electric motor 52, the revolution electric motor 53, the grasping electric motor 54 in the first mobile carrier 19 are also connected to the counter circuit 68. The counter circuit 68 is designed to count the pulses output from the encoders in the electric motors 49, 51-54. A temporal change is recorded in the RAM 58 for the amounts of movement in the y-, z- and x-axis and the amount of rotation of the mobile unit 22 as well as the amount of movement of the claws 24a in the mobile unit 22, respectively. Here, the y-axis electric motor 63, the z-axis electric motor 64, x-axis electric motor 65, the revolution electric motor 66, the grasping electric motor 67 in the second mobile carrier 21 may likewise be connected to the counter circuit 55 on the first controller board 42. A temporal change may be recorded in the RAM 44 on the first controller board 42 for the amounts of movement in the y-, z- and x-axis and the amount of rotation of the mobile unit 23 as well as the amount of movement of the claws 24a in the mobile unit 23, respectively.

The first and second controller boards 42, 56 are connected to the library controller board 69. The library controller board 69 includes a CPU 70, a RAM 71 and a non-volatile memory 72, for example. A software program 73 is stored in the non-volatile memory 72. The CPU 70 executes various processings based on the software program temporarily stored in the RAM 71. The library controller board 69 is connected to the host computer.

Figure 6:
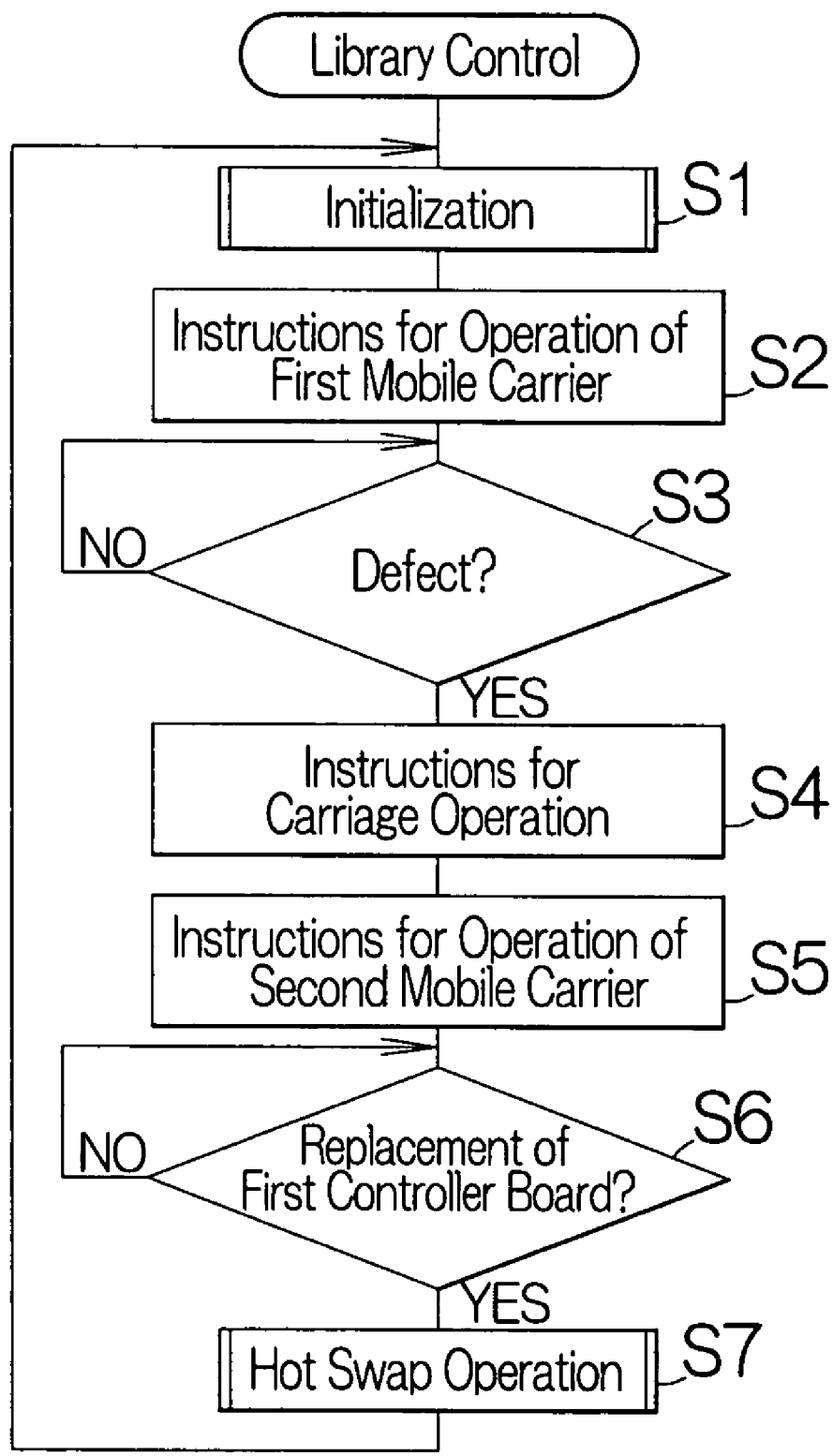
FIG. 6 is a flowchart schematically illustrating the process of a library control.

Next, description will be made on the operation of the magnetic tape library apparatus 11. The CPU 70 on the library controller board 69 executes the library control based on the software program in the non-volatile memory 72. As shown in FIG. 6, the CPU 70 first effects the initialization at step S1. The counts of the counter circuit 55, 68 are related to the y-, z- and x-coordinates, the amount or angle of rotation of the mobile unit 22, 23 and the coordinate of movement of the claws 24a. The initialization will be described later in detail.

At step S2, the CPU 70 supplies the first controller board 42 with instruction signals to operate the first mobile carrier 19. The instruction signals specify the counts of the counter circuit 55 corresponding to the y-, z- and x-coordinates, the amount or angle of rotation of the mobile unit 22, 23 and the coordinate of movement of the claws 24a. The grasping mechanism 24 of the first mobile carrier 19 is allowed to face a target cell 14 or a target magnetic tape drive 16 based on the coordinates and angle of rotation. When the grasping mechanism 24 is opposed to the cell 14, the magnetic tape cartridge 15 in the cell 14 can be taken into the mobile unit 22. The magnetic tape cartridge 15 in the mobile unit 22 can be returned to the cell 14. The magnetic tape cartridge 15 can in this manner be transported between the cells 14 and the magnetic tape drives 16. The magnetic tape drives 16 serve to read the information data recorded on the magnetic recording tape in the magnetic tape cartridge 15, or to write the information data into the magnetic recording tape in the magnetic tape cartridge 15. The second mobile carrier 21 stands on the off position during the operation of the first mobile carrier 19.

The CPU 70 keeps monitoring occurrence of a defect in the first controller board 42 during the operation of the first mobile carrier 19 at step S3. If a defect happens in the first controller board 42, the processing of the CPU 70 advances to step S4. The CPU 70 supplies the second controller board 56 with instruction signals for carriage operation at step S4. The first mobile carrier 19 is conveyed to the off position in the carriage operation. The CPU 70 then supplies the second mobile carrier 21 with instruction signals to operate the second mobile carrier 21 at step S5. The second mobile carrier 21 in this manner takes over the transportation of the magnetic tape cartridge 15 from the first mobile carrier 19. The carriage operation will be described later in detail. The library controller board 69, the second controller board 56 and the second mobile carrier 21 keep operating even during the replacement of the first controller board 42.

The CPU 70 thereafter serves to inform an operator of the defect of the first mobile carrier 19 at step S6. The CPU 70 simultaneously monitors the replacement of the first controller board 42. When the first controller board 42 has been replaced, the processing of the CPU 70 advances to step S7. The CPU 70 effects a hot swap operation at step S7. A new first controller board 42 is connected to the first mobile carrier 19 based on the hot swap operation. When the replacement of the first controller board 42 has been completed in this manner, the processing of the CPU 70 returns to step S1. The CPU 70 anew effects the initialization. The first mobile carrier 19 thus returns to the normal operation to transport the magnetic tape cartridge 15. The second mobile carrier 21 stays at the off position.

Even if a defect occurs in the first controller board 42, the magnetic tape library apparatus 11 allows the second mobile carrier 21 to take over the transportation of the magnetic tape cartridge 15. The first controller board 42 can be replaced without termination of the operation in the library controller board 69 and the second controller board 56. Write and read operations of information data can thus be kept in the magnetic tape library apparatus 11 without any interruption.

It should be noted that the second mobile carrier 21 may keep operating even after the replacement of the first controller board 42 in the magnetic tape library apparatus 11. In this case, the z-axis electric motor 64, the x-axis electric motor 65, the revolution electric motor 66 and the grasping electric motor 67 may be connected to the counter circuit 55 on the first controller board 42 in the manner as described above.

Figure 7:
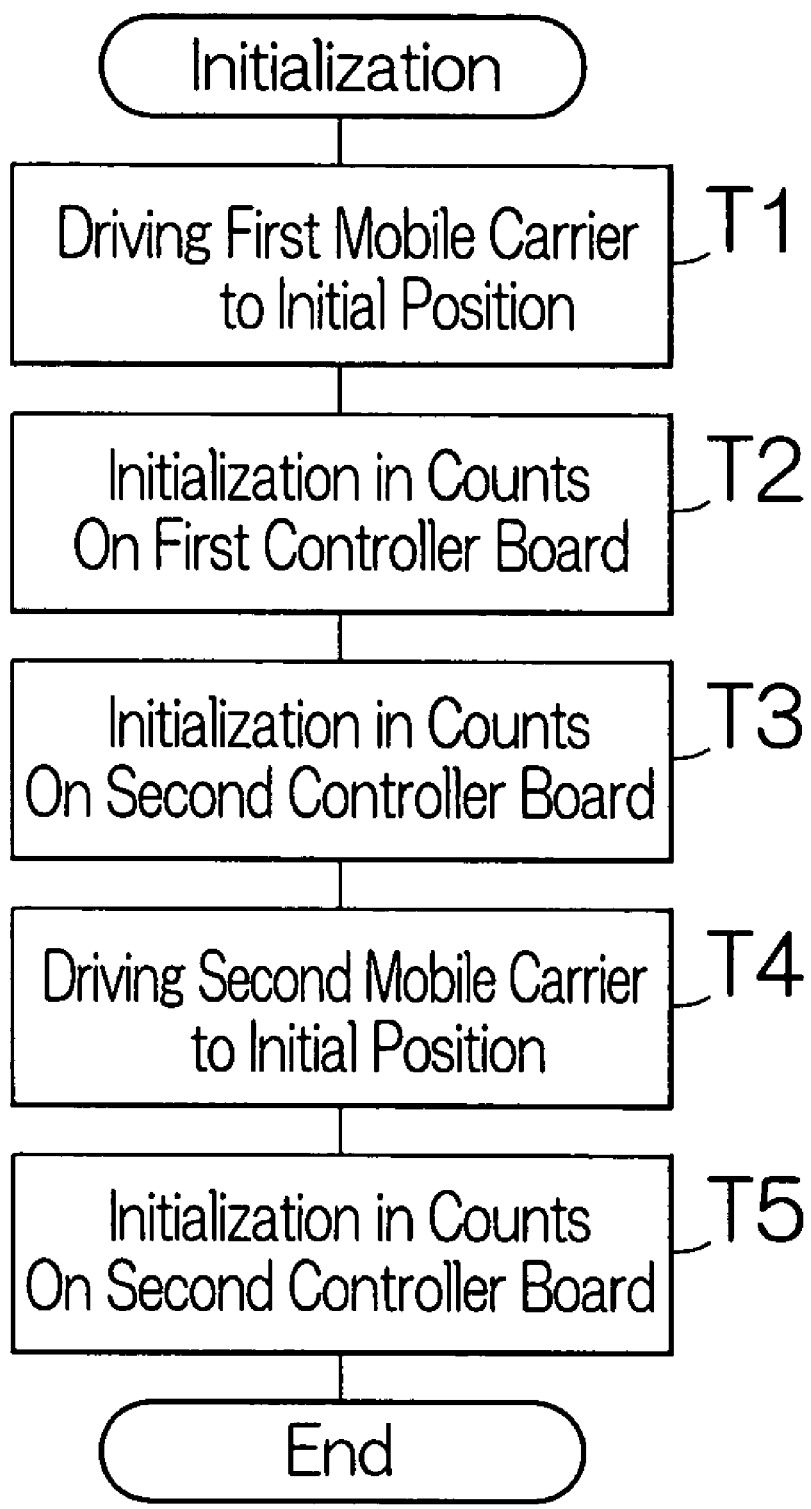
FIG. 7 is a flowchart schematically illustrating the process of an initialization in the library control.

Next, a detailed description will be made on the initialization. As shown in FIG. 7, the CPU 70 supplies the first controller board 42 with instruction signals to operate the first mobile carrier 19 at step T1. The y-axis electric motor 49, the z-axis electric motor 51, the x-axis electric motor 52 and the revolution electric motor 53 in the first mobile carrier 19 are forced to rotate farthest in a predetermined direction based on the instruction signals. For example, the first rail base 26 is thus driven to collide against a stop at the end of the first rail 25. The second rail base 31 is also driven to collide against a stop at the end of the second rail. The mobile unit 22 collides against a stop at the end of the third rail. The rotation of the mobile unit 22 is restrained with a stop. The initial position can be set for the first mobile carrier 19 in this manner. The x-, y- and z-coordinates and the amount of rotation of the initial position are written into the non-volatile memory 45.

The CPU 70 then resets the counter circuit 55 on the first controller board 42 at step T2. The initial values of the x-, y- and z-coordinates and the amount of rotation can be set for the mobile unit 22 in the counter circuit 55. When the first mobile carrier 19 moves from the initial position, the position and angle of the mobile unit 22 can be determined relative to the initial position based on the counts of the counter circuit 55. The position and angle of the mobile unit 22 can in this manner be determined based on the xyz-coordinate system.

The CPU 70 resets the counter circuit 68 on the second controller board 56 at step T3. The initial values of the x-, y- and z-coordinates and the amount of rotation can likewise be set in the counter circuit 68 on the second controller board 56. The position and angle of the mobile unit 22 can also be determined on the second controller board 56.

The CPU 70 supplies the second controller board 56 with instruction signals to operate the second mobile carrier 21 at step T4. The y-axis electric motor 63, the z-axis electric motor 64, the x-axis electric motor 65 and the revolution electric motor 66 in the second mobile carrier 21 are forced to rotate farthest in a predetermined direction based on the instruction signals. The initial position can thus be set for the second mobile carrier 21 in the same manner as described above. The x-, y- and z-coordinates and the amount of rotation of the initial position are written into the non-volatile memory 59.

The CPU 70 then resets the counter circuit 68 on the second controller board 56 at step T5. The initial values of the x-, y- and z-coordinates and the amount of rotation can be set for the mobile unit 23 in the counter circuit 68. When the second mobile carrier 21 moves from the initial position, the position and angle of the mobile unit 23 can be determined relative to the initial position based on the counts of the counter circuit 68. The position and angle of the mobile unit 23 can in this manner be determined based on the xyz-coordinate system.

Figure 8:
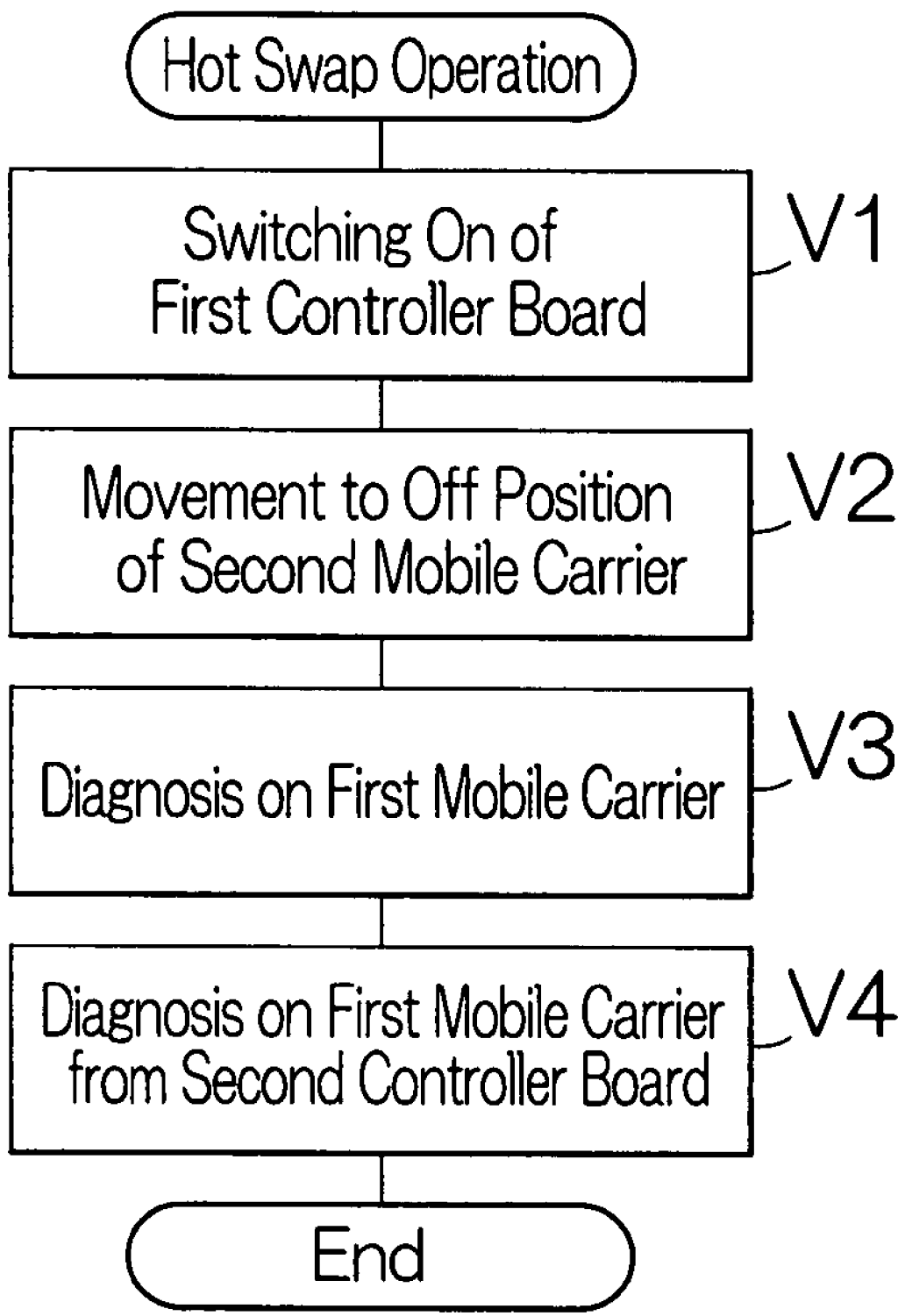
FIG. 8 is a flowchart schematically illustrating the process of a hot swap operation in the library control.

Next, a detailed description will be made on the hot swap operation. As shown in FIG. 8, the CPU 70 first switches on the first controller board 42 newly inserted in the hot swap operation at step V1. When the operation of the first controller board 42 has been confirmed, the CPU 70 supplies the second controller board 56 with instruction signals to drive the second mobile carrier 21 to the off position at step V2. The y-axis electric motor 63, the z-axis electric motor 64, the x-axis electric motor 65 and the revolution electric motor 66 rotate in response to the supply of the instruction signals. The second mobile carrier 21 is positioned at the off position.

When the operation of the second mobile carrier 21 has been confirmed, the CPU 70 supplies the first controller board 42 with instruction signals to diagnose the first mobile carrier 19 at step V3. The CPU 43 on the first controller board 42 operates to cause the rotation of the y-axis electric motor 49, the z-axis electric motor 51, the x-axis electric motor 52 and the revolution electric motor 53 by predetermined amounts of rotation, respectively. The counter circuit 55 counts the pulses during the rotation for the electric motors 49, 51-53. If the counts on the pulses correspond to predetermined values, the first mobile carrier 19 is considered normal.

When the first mobile carrier 19 has been considered normal, the CPU 70 supplies the second controller board 56 with instruction signals to diagnose the first mobile carrier 19 at step V4. The CPU 57 on the second controller board 57 operates to cause the rotation of the z-axis electric motor 51, the x-axis electric motor 52 and the revolution electric motor 53 by predetermined amounts of rotation, respectively. The counter circuit 68 counts the pulses during the rotation for the electric motors 51-53. If the counts on the pulses correspond to predetermined values, the first mobile carrier 19 is considered normal based on the operation of the second controller board 56. The hot swap operation is in this manner completed.

Figure 9:
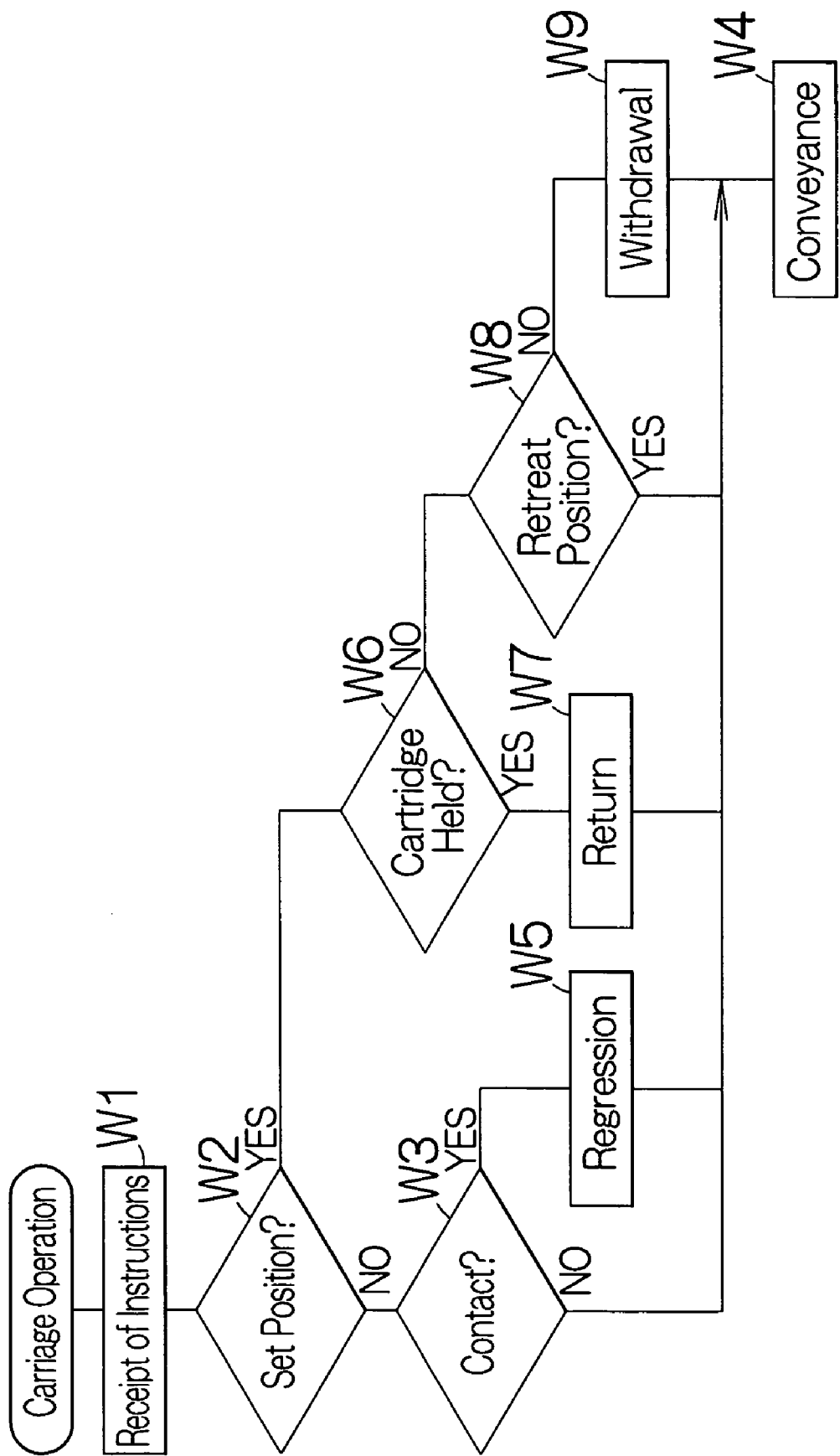
FIG. 9 is a flowchart schematically illustrating the process of the second controller board in a carriage operation.

Next, a detailed description will be made on the carriage operation. As shown in FIG. 9, when the CPU 57 receives the instruction signals from the CPU 70 on the library controller board 69 at step W1, the CPU 57 checks the position and angle of rotation for the mobile unit 22 at step W2. In this case, the CPU 57 refers to the counts of the counter circuit 68. If the counts specifies the coordinates and angle of any cell 14, the grasping mechanism 24 is considered to be on the set position.

If the grasping mechanism 24 deviates from the set position, the CPU 57 checks contact between the mobile unit 22 and the storage cabinets 13a, 13b at step W3. The CPU 57 refers to the position and angle of rotation for the mobile unit 22 in the aforementioned manner. If the obtained position and angle of rotation corresponds to the position and angle of rotation that are established during the contact, the CPU 57 determines establishment of contact between the mobile unit 22 and the storage cabinet 13a, 13b. The position and angle of rotation that are established during contact may previously be stored in the non-volatile memory 59.

If any contact is not observed, the processing of the CPU 57 advances to step W4. The CPU 57 operates to drive the second mobile carrier 21 at step W4. A driving signal is supplied to the y-axis electric motor 63, for example. The first rail base 29 of the second mobile carrier 21 thus moves downward toward the off position of the first mobile carrier 19. The first rail base 29 of the second mobile carrier 21 collides against the first rail base 26 of the first mobile carrier 19 during the downward movement. The elastic pieces 32, 33 collide against each other. Here, no restraint is applied to the y-axis electric motor 49 in the first mobile carrier 19. When the second mobile carrier 21 keeps moving downward, the first mobile carrier 19 is conveyed to the off position.

If a contact is observed at step W3, the CPU 57 operates to drive the first mobile carrier 19 at step W5. The first mobile carrier 19 is thus withdrawn from the storage cabinet 13a, 13b. The z-axis electric motor 51, the x-axis electric motor 52 and/or the revolution electric motor 53 operates in the first mobile carrier 19 in this case. The CPU 57 forces the first mobile carrier 19 to regress along the trace based on the record on the movement of the first mobile carrier 19 stored in the RAM 58. The mobile unit 22 is thus reliably disengaged from the storage cabinet 13a, 13b. The processing of the CPU 57 thereafter advances to step W4. The CPU 57 operates to drive the second mobile carrier 21 to convey the first mobile carrier 19 to the off position at step W4 in the aforementioned manner.

If the CPU 57 finds the mobile unit 22 on the set position at step W2, the CPU 57 checks the presence of the magnetic tape cartridge 15 at step W6. The CPU 57 refers to the sensor signal from the sensor 39. If the grasping mechanism 24 holds the magnetic tape cartridge 15, the processing of the CPU 57 advances to step W7. The CPU 57 operates to drive the grasping mechanism 24 at step W7. The magnetic tape cartridge 15 is thus returned to the cell 14. The claws 24a of the grasping mechanism 24 are thereafter completely withdrawn into the mobile unit 22. When the withdrawal of the claws 24a has been confirmed, the processing of the CPU 57 advances to step W4. The CPU 57 operates to drive the second mobile carrier 21 to convey the first mobile carrier 19 to the off position at step W4 in the aforementioned manner. If a driving force is applied from the second mobile carrier 21 to the first mobile carrier 19 that holds the magnetic tape cartridge 15 engaging the cell 14, the movement of the first mobile carrier 19 should be hindered. If the presence of the magnetic tape cartridge 15 in the mobile unit 22 is checked in the aforementioned manner, any interference can reliably be avoided between the first mobile carrier 19 and the cells 14. In addition, if the first mobile carrier 19 is conveyed to the off position with the magnetic tape cartridge 15 held within the mobile unit 22, the magnetic tape cartridge 15 inside the mobile unit 22 cannot be accessed until the first controller board 42 recovers from the defect. If the magnetic tape cartridge 15 in the grasping mechanism 24 is always returned to the cell 14 in the aforementioned manner, all the magnetic tape cartridges 15 are accessed even during the malfunction of the first controller board 42.

If no magnetic tape cartridge 15 is found in the grasping mechanism 24 at step W6, the CPU 57 checks the position of the claws 24a at step W8. The CPU 57 refers to the amount of rotation for the grasping electric motor 54 based on the counts in the counter circuit 68. If the claws 24a are positioned at the retreat position, the processing of the CPU 57 advances to step W4. The CPU 57 operates to drive the second mobile carrier 21 to convey the first mobile carrier 19 to the off position at step W4 in the aforementioned manner. If the claws 24a are positioned off the retreat position, the CPU 57 operates to drive the grasping electric motor 54. The claws 24a are thus withdrawn into the mobile unit 22. The processing of the CPU 57 then advances to step W4. The CPU 57 operates to drive the second mobile carrier 21 to convey the first mobile carrier 19 to the off position at step W4 in the aforementioned manner. If the claws 24a are positioned at the retreat position, the claws 24a are completely set inside the mobile unit 22. The claws 24a are reliably prevented from contacting with the storage cabinet 13a, 13b. The movement of the first mobile carrier 19 is not hindered. On the other hand, if the claws 24a are positioned forward of the retreat position, the claws 24a often protrude out of the mobile unit 22. The claws 24a sometimes contact with the storage cabinet 13a, 13b. The movement of the first mobile carrier 19 should be hindered.

It should be noted that optical disks may be employed as the recording medium in place of the aforementioned magnetic tape cartridge 15, for example.

What is claimed is:

1. A transport mechanism in a library apparatus, comprising:
    a first mobile carrier accessible to individual cells defined in a storage in the library apparatus, the first mobile carrier configured to move along a first path in the library apparatus;
    a second mobile carrier accessible to the individual cells, the second mobile carrier configured to move along a second path at least partially wrapping over the first path in the library apparatus;
    a first controller circuit disposed in the library apparatus, the first controller circuit being connected to a driving motor incorporated within the first mobile carrier for supplying a driving signal to the driving motor;
    a second controller circuit disposed in the library apparatus, the second controller circuit being connected to a driving motor incorporated within the second mobile carrier for supplying a driving signal to the driving motor within the second mobile carrier, the second controller circuit being connected to the driving motor in the first mobile carrier for supplying a driving signal to the driving motor in the first mobile carrier; and
    a library controller connected to a host computer outside the library apparatus, the library controller connected to the first controller circuit and the second controller circuit, the library controller monitoring an occurrence of a defect in the first controller circuit during an operation of the first mobile carrier, the library controller instructing the second controller circuit to supply the driving signal to the driving motor in the first mobile carrier to convey the first mobile carrier to a position outside the second path of the second mobile carrier when the defect has occurred in the first controller circuit, wherein the library controller is configured to monitor replacement of the first controller circuit, to switch on the first controller circuit when the library controller detects the replacement of the first controller circuit, to drive the second mobile carrier to a position outside the first path of the first mobile carrier, and to instruct the first controller circuit to diagnose the first mobile carrier.

2. The transport mechanism according to claim 1, further comprising a grasping mechanism incorporated within the first mobile carrier, the grasping mechanism configured to move based on a driving force from the driving motor between a first position where the grasping mechanism holds an object in one of the cells and a second position where the grasping mechanism is withdrawn from the cell.

3. The transport mechanism according to claim 1, further comprising a detector incorporated within the first mobile carrier for connection to the first and second controller circuits, the detector configured to detect status of the first mobile carrier.

4. A method of controlling a transport mechanism in a library apparatus, comprising:
    controlling a first mobile carrier based on operation of a first controller circuit, disposed in the library apparatus, when the first controller circuit has received instructions from a library controller in the library apparatus to cause the first mobile carrier to access to a cell defined in a storage in the library apparatus, the first controller circuit connected to a driving motor incorporated within the first mobile carrier for supplying a driving signal to the driving motor, the library controller being connected to a host computer outside the library apparatus;
    controlling a movement of the first mobile carrier to an off position based on operation of a second controller circuit, disposed in the library apparatus, receiving instructions from the library controller to convey the first mobile carrier when a defect is detected in the first controller circuit, the second controller circuit being connected to a driving motor incorporated within a second mobile carrier for supplying a driving signal to the driving motor in the second mobile carrier, the second controller circuit being connected to the driving motor in the first mobile carrier for supplying a driving signal to the driving motor in the first mobile carrier to convey the first mobile carrier to the off position, the off position being set outside a movement range of the second mobile carrier; and
    controlling the second mobile carrier to take over the access from the first mobile carrier based on operation of the second controller circuit when the second controller circuit has received instructions from the library controller, wherein the library controller is configured to monitor replacement of the first controller circuit, to switch on the first controller circuit when the library controller detects the replacement of the first controller circuit, to drive the second mobile carrier to a position outside the first path of the first mobile carrier, and to instruct the first controller circuit to diagnose the first mobile carrier.

5. The method according to claim 4, wherein status of a grasping mechanism is monitored to detect a defect of the grasping mechanism when the defect in the first controller circuit is detected, the grasping mechanism being incorporated within the first mobile carrier so as to grasp an object in the cell.

6. The method according to claim 5, wherein the second controller circuit operates to withdraw the grasping mechanism from the cell when the defect of the grasping mechanism has been detected.

7. The method according to claim 4, wherein contact is monitored between the first mobile carrier and the storage when the defect in the first controller circuit is detected.

8. The method according to claim 7, wherein the second controller circuit operates to withdraw the first mobile carrier out of the storage when the defect has been detected.

9. A computer-readable storage medium containing program instructions for controlling a transport mechanism in a library apparatus, comprising:
    computer program code causing a processor to cause a first controller circuit, disposed in the library apparatus, connected to a driving motor incorporated within a first mobile carrier for supplying a driving signal to the driving motor, to control the first mobile carrier when the processor receives instructions from a library controller, disposed in the library apparatus, to cause the first mobile carrier to access a cell defined in a storage in the library apparatus, the library controller being connected to a host computer outside the library apparatus;

computer program code causing the processor to check a status of the first mobile carrier when the processor has received a signal specifying a defect in the first mobile carrier;

computer program code causing the processor to cause a second controller circuit, disposed in the library apparatus, connected to a driving motor incorporated within a second mobile carrier for supplying a driving signal to the driving motor in the second mobile carrier, to control a movement of the first mobile carrier to an off position when the defect is detected in the first controller circuit, the second controller circuit being connected to the driving motor in the first mobile carrier for supplying a driving signal to the driving motor in the first mobile carrier to convey the first mobile carrier to the off position, the off position being set outside a movement range of the second mobile carrier; and computer program code causing the processor to cause the second controller circuit to control the second mobile carrier to take over the access from the first mobile carrier when the second controller circuit receives instructions from the library controller, wherein the library controller is configured to monitor replacement of the first controller circuit, to switch on the first controller circuit when the library controller detects the replacement of the first controller circuit, to drive the second mobile carrier to a position outside the first path of the first mobile carrier, and to instruct the first controller circuit to diagnose the first mobile carrier.

10. The computer-readable storage medium according to claim 9, wherein status of a grasping mechanism is monitored to check the status, the grasping mechanism being incorporated within the first mobile carrier so as to grasp an object in the cell defined in the storage.

11. The computer-readable storage medium according to claim 10, further containing program instructions comprising computer program code causing the processor to allow the grasping mechanism to withdraw from the cell when the processor has received the signal.

12. The computer-readable storage medium according to claim 9, wherein contact is monitored between the first mobile carrier and the storage defining cells so as to check the status.

13. The computer-readable storage medium according to claim 12, further containing program instructions comprising computer program code causing the processor to allow the first mobile carrier to withdraw from the storage when the processor has received the signal.

14. The transport mechanism according to claim 1, wherein the library controller is configured to instruct the second controller circuit to diagnose the first mobile carrier when the first controller circuit detects a normal operation of the first mobile carrier through a diagnosis.

* * * * *